(12) United States Patent
Naka et al.

(10) Patent No.: US 12,009,945 B2
(45) Date of Patent: Jun. 11, 2024

(54) COMMUNICATION SYSTEM, RELAY DEVICE, RECEPTION DEVICE, AND COMMUNICATION CONTROL METHOD

(71) Applicants: Nissan Motor Co., Ltd., Yokohama (JP); RENAULT S.A.S., Boulogne-Billancourt (FR)

(72) Inventors: Ken Naka, Kanagawa (JP); Takashi Yamaguchi, Kanagawa (JP); Hideaki Yamada, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 18/245,359

(22) PCT Filed: Sep. 29, 2020

(86) PCT No.: PCT/IB2020/000825
§ 371 (c)(1),
(2) Date: Mar. 15, 2023

(87) PCT Pub. No.: WO2022/069915
PCT Pub. Date: Apr. 7, 2022

(65) Prior Publication Data
US 2023/0362032 A1 Nov. 9, 2023

(51) Int. Cl.
*H04L 12/46* (2006.01)
(52) U.S. Cl.
CPC .................... *H04L 12/46* (2013.01)
(58) Field of Classification Search
None
See application file for complete search history.

(56) References Cited

U.S. PATENT DOCUMENTS

2019/0273690 A1* 9/2019 Akahane ............. H04L 12/4645

FOREIGN PATENT DOCUMENTS

EP    3 062 476 A1    8/2016
JP    2018-70121 A    5/2018
(Continued)

OTHER PUBLICATIONS

Extended European Search Report of Oct. 12, 2023 of corresponding European Patent Application No. 20956141.4.

*Primary Examiner* — Brian Whipple
(74) *Attorney, Agent, or Firm* — Global IP Counsellors, LLP (57) ABSTRACT

A communication system includes a first communication device, a second communication device and a relay device. The first and second communication devices are connected to a communication network. The relay device is connected to the communication network and relays communication between the first and second communication devices. The relay device includes a relay unit and a priority determination unit. The relay unit carries out a receiving process for receiving data frames transmitted from the first communication device to the communication network and a transmission process for transmitting the received data frames to the second communication device. The priority determination unit determines the priority of the transmission process of the received data frames based on the data frames received by the relay unit. The relay unit carries out a transmission process of the data frames based on the priority determined by the priority determination unit.

19 Claims, 9 Drawing Sheets

(56) References Cited

FOREIGN PATENT DOCUMENTS

| | | |
|---|---|---|
| JP | 2019-165473 A | 9/2019 |
| WO | 2018/135098 A1 | 7/2018 |

* cited by examiner

COMMUNICATION SYSTEM, RELAY DEVICE, RECEPTION DEVICE, AND COMMUNICATION CONTROL METHOD

CROSS-REFERENCE TO RELATED APPLICATIONS

This application is a U.S. national stage application of International Application No. PCT/IB2020/000825, filed on Sep. 29, 2020.

BACKGROUND

Technical Field

The present invention relates to a communication system, a relay device, a receiving device, and a communication control method for sending and receiving data frames via a communication network.

Background Information

International Publication No. 2018/135098 (Patent Document 1) discloses an in-vehicle network system comprising a plurality of ECUs (Electronic Control Units) for controlling in-vehicle devices, an in-vehicle network such as a CAN (Controller Area Network) that connects each of the ECUs for intercommunication, and a CGW (Central Gate Way) that relays communications between the ECUs. The CGW receives data frames transmitted from the transmission source ECU to the CAN, and transmits the received data frames to the transmission destination ECU. The in-vehicle network system of Patent Document 1 uses a known Message Authentication Code (hereinafter also referred to as a "MAC") to verify the validity of data frames in order to deal with replay attacks, etc., on the in-vehicle network.

SUMMARY

After receiving and buffering a plurality of data frames, the CGW transmits the data frames to the transmission destination ECU in the order in which the data frames were received. As a result, there is the possibility that important data frames will be sent late and that the transmission destination ECU may not be able to receive the important data frames at an appropriate timing.

The problem to be solved by the present invention is to reduce the security risk while suppressing the excessive discarding of data frames, even if the data frame transmission frequency, etc., changes.

The present invention solves the problem described above with above by a communication system, comprising a first communication device and a second communication device that are connected to a communication network, and a relay device that is connected to the communication network and that relays communications between the first communication device and the second communication device, wherein the second communication device includes a counter value verification unit that stores counter value management information for managing counter values of data frames transmitted by the first communication device, the counter value of a prescribed numerical width is registered in the counter value management information, and the second communication device controls the numerical width of the counter values registered in the counter value management information.

With the present invention, security risks can be reduced while suppressing the excessive discarding of data frames, even when the data frame transmission frequency, etc., change.

BRIEF DESCRIPTION OF THE DRAWINGS

Referring now to the attached drawings which form a part of this original disclosure.

DETAILED DESCRIPTION

Embodiments of the present invention will be described below based on the drawings.

Figure 1:
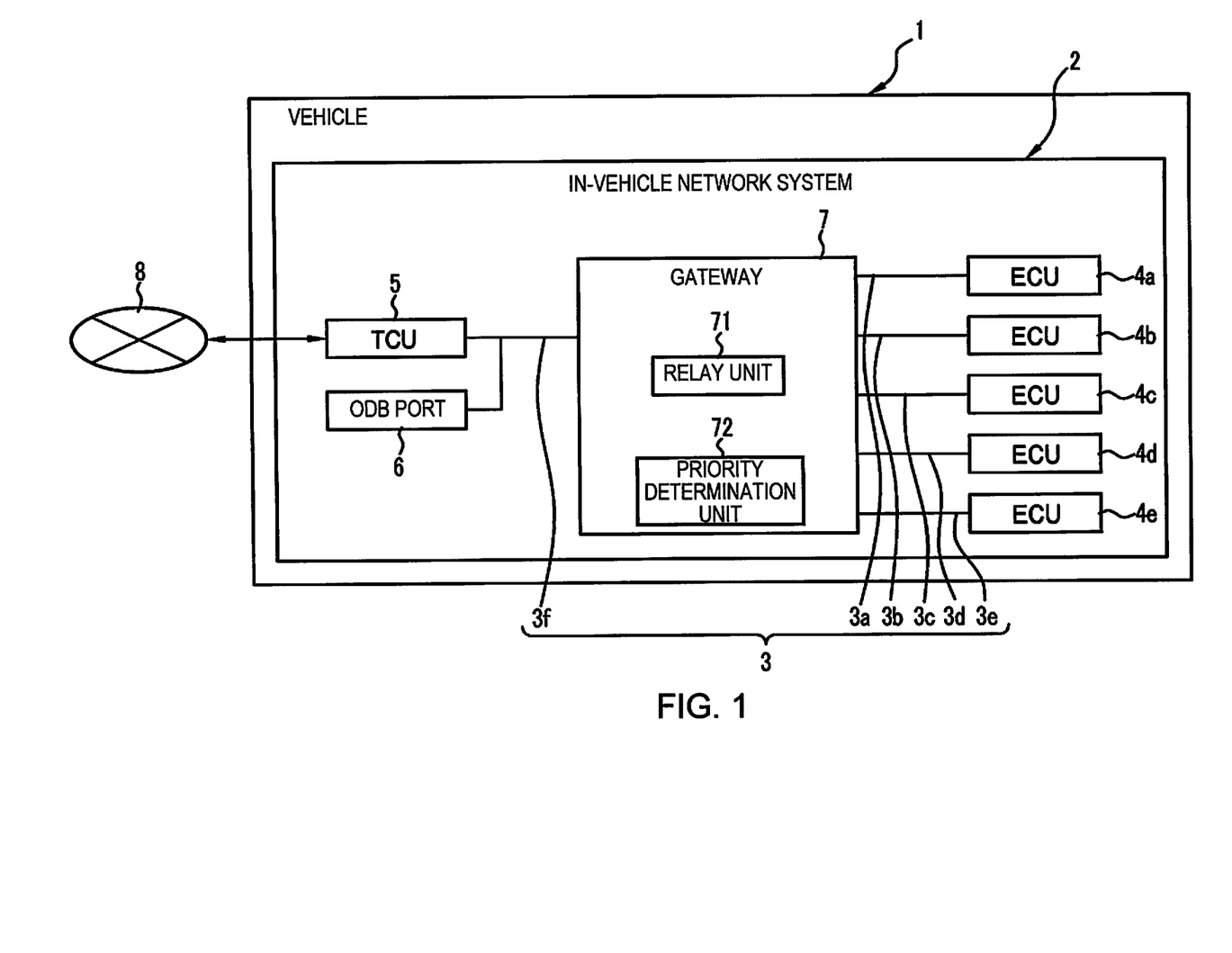
FIG. 1 is a block diagram of an in-vehicle network system to which the communication system, relay device, receiving device, and communication control method of the present invention are applied.

In the present embodiment, a communication system, a relay device, a receiving device, and a communication control method according to the present invention will be described using an example in which they are applied to an in-vehicle network system. As shown in FIG. 1, an in-vehicle network system 2 according to the present embodiment is installed in a vehicle 1, which is an automobile. The in-vehicle network system 2 comprises a CAN 3, a plurality of ECUs 4a, 4b, 4c, 4d, and 4e connected to the CAN 3, a TCU (Telematics Control Unit) 5, an OBD (On-board diagnostics) port 6, and a gateway 7. The CAN 3 corresponds to one example of the communication network of the present invention. Further, the ECUs 4a-4e and the TCU 5 correspond to one example of the first communication device, the second communication device, and the receiving device of the present invention. Further, the gateway 7 corresponds to one example of the relay device of the present invention. The ECUs 4a-4e are collectively referred to as ECU 4.

The CAN 3 includes a plurality of buses 3a, 3b, 3c, 3d, 3e, and 3f, to which each ECU 4, the TCU 5, the gateway 7, etc., are connected. In the communication protocol of the CAN 3, each ECU 4, the TCU 5, etc., respectively connected to the buses 3a-3f, send and receive messages called data frames. No identifier that indicates the transmission source or the transmission destination is appended to the data frame, and each ECU 4 and the TCU 5 append identification information referred to as a CAN ID (also referred to as message ID) to each data frame and transmit the data frame to the buses 3a-3f. The CAN ID is an identifier that indicates the type of message, and each ECU 4 and the TCU 5 receive only prescribed CAN IDs.

Each of the ECUs 4a-4e is connected to an in-vehicle device such as a sensor or an actuator, not shown. Further, each of the ECUs 4a-4e acquires sensor information indicating the detection results of a sensor from a connected sensor, and transmits a data frame containing control information that includes the acquired sensor information to the buses 3a-3f. Further, each of the ECUs 4a-4e receives a data frame from the buses 3a-3f and controls in-vehicle devices such as an actuator based on the control information stored in the received data frame.

The CAN 3 constitutes, by means of the buses 3a-3f, and the ECUs 4a-4e and the TCU 5 connected to the buses 3a-3f, a plurality of control groups divided in accordance with the basic configurations of the vehicle 1. These control groups are also called domains. The bus 3a and the ECU 4a, for example, constitute a multimedia domain and control information presentation devices, such as a head unit that includes car navigation devices. Further, the bus 3b and the ECU 4b, for example, constitute an ADAS (Advanced Driver Assistance System) domain and control in-vehicle devices related to travel assistance control, such as cameras, radars, LIDAR (Light Detection and Ranging), object recognition devices that carry out sensor fusion processes based on their outputs, etc. The bus 3c and the ECU 4c, for example, constitute a powertrain domain and control the drive sources of the vehicle 1, such as an engine and a motor. Further, the bus 3d and the ECU 4d, for example, constitute a chassis domain and control chassis-related in-vehicle devices such as a steering mechanism. Further, the bus 3e and the ECU 4e, for example, constitute a body domain and control body-related in-vehicle devices such as power windows.

The TCU 5 is a communication ECU that connects to and communicates with an external communication network 8 outside of the vehicle 1. The external communication network 8 is a telecommunications network, such as the Internet, a WAN (Wide Area Network), a LAN (Local Area Network), a public line, a mobile communications network such as LTE (Long Term Evolution"), etc. An OBD port 6 outputs various types of information that flow through CAN 3, such as information indicating the operating state of the vehicle 1, to an external device. The TCU 5, the OBD port 6, and the bus 3f to which they are connected constitute an external communication domain, for example. That is, data frames flowing through the bus 3f include, for example, data frames transmitted from a device on the external communication network 8 side and data frames transmitted from a device connected to the OBD port 6.

The gateway 7 is an ECU that is connected to the plurality of buses 3a-3f of the CAN 3 and that executes a routing process and a relay process of data frames between the buses. Conventional gateways receive and buffer a plurality of data frames and then transmit the data frames to the transmission destination ECU in the order in which the data frames are received. Consequently, there was the risk of transmitting important data frames late and of the transmission destination ECU not receiving the important data frames at an appropriate timing. In order to solve such problems, the gateway 7 of the present embodiment is equipped with a relay unit 71 and a priority determination unit 72.

The relay unit 71 of the gateway 7 performs a receiving process for receiving data frames transmitted to the CAN 3 from the transmission source ECU 4 or TCU 5, and a transmission process for transmitting the received data frames to the transmission destination ECU 4 or TCU 5. Further, the priority determination unit 72 of the gateway 7 determines the priority of the transmission process of the received data frames based on the data frames received by means of the receiving process of the relay unit 71. Specifically, when the relay unit 71 receives and buffers a plurality of data frames, the priority determination unit 72 determines the priority of the transmission process of the plurality of data frames based on the CAN ID of the buffered plurality of data frames. In the in-vehicle network system 2 of the present embodiment, the CAN ID is set so that its numerical value decreases with increasing importance of the data frame. Data frames of greater importance include, for example, data frames related to the travel control of the vehicle 1. The priority determination unit 72 can thereby determine the priority of the transmission process based on the CAN ID. The relay unit 71 performs the transmission processing of a plurality of data frames based on the determined priority. More specifically, the relay unit 71 performs the transmission process for data frames with higher priority prior to those with lower priority.

Figure 2:
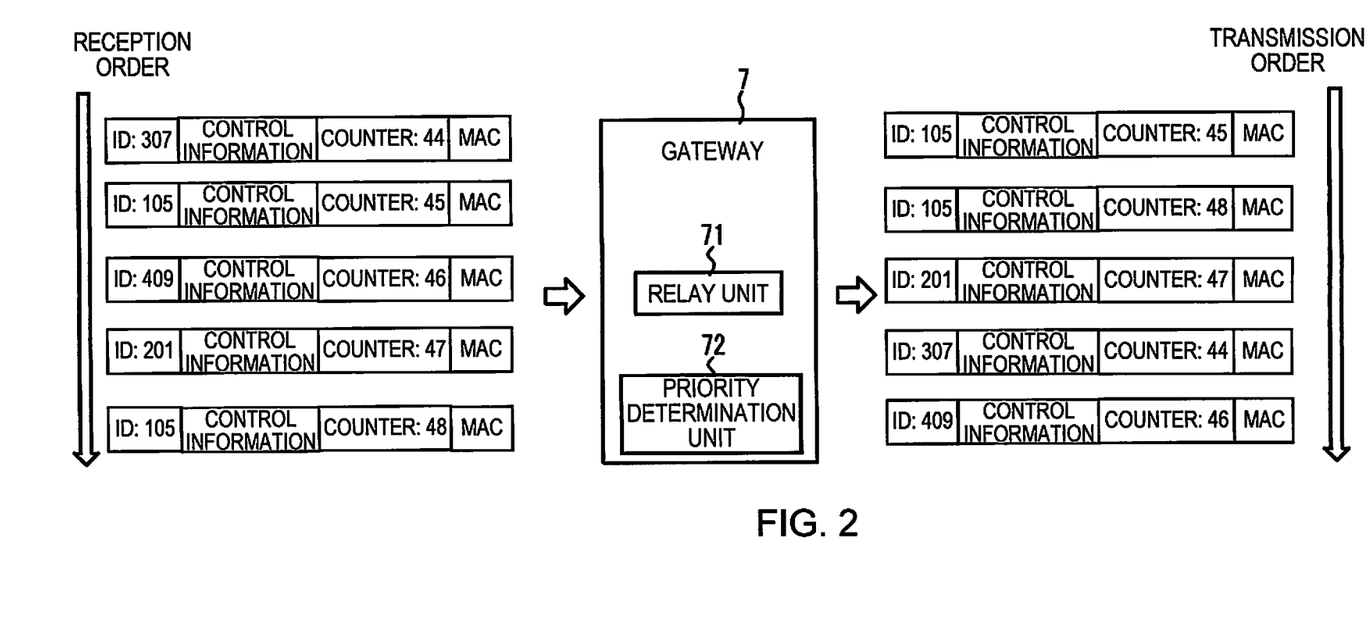
FIG. 2 is an explanatory diagram showing a state in which a priority of the transmission process of data frames is determined by means of the gateway of FIG. 1.

As shown in FIG. 2, the relay unit 71 of the gateway 7, for example, receives and buffers data frames with CAN IDs "307," "105," "409," "201," and "105" in sequence. In this case, the priority determination unit 72 determines the priority such that the transmission process is performed in ascending order of the CAN ID. Also, if there is more than one data frame with the same CAN ID, such as the data frames with CAN ID "105," the priority of the data frame with the smaller counter value, which indicates the order of transmission of the data frames, is higher. Details of the data frame counter value will be described further below. In other words, the priority determination unit 72 determines the priority such that the transmission processing priority increases in the following order: "105 (counter value: 45)," "105 (counter value: 48)," "201," "307," and "409." The relay unit 71 transmits data frames with CAN IDs "105 (counter value: 45)," "105 (counter value: 48)," "201," "307," and "409," in sequence, based on the determination result of the priority determination unit 72. This enables the transmission destination ECU 4 or TCU 5 to receive the data frames at an appropriate timing in accordance with the level of priority.

The ECU 4 is configured by a computer with hardware and software. Although not shown in detail, the ECU 4 includes a ROM (Read-Only Memory) for program storage, a CPU (Central Processing Unit) that executes the programs stored in the ROM, and a RAM (Random-Access Memory) for the temporary storage of data generated during program execution. Control programs are stored in ROM for carrying out control processes corresponding to in-vehicle devices connected each of the ECUs 4a-4f. Operating circuits include an MPU (Micro Processing Unit), DSP (Digital Signal Processor), ASIC (Application-Specific Integrated Circuit), FPGA (Field Programmable Gate Array), etc., which may be used instead of or in conjunction with the CPU.

Figure 3:
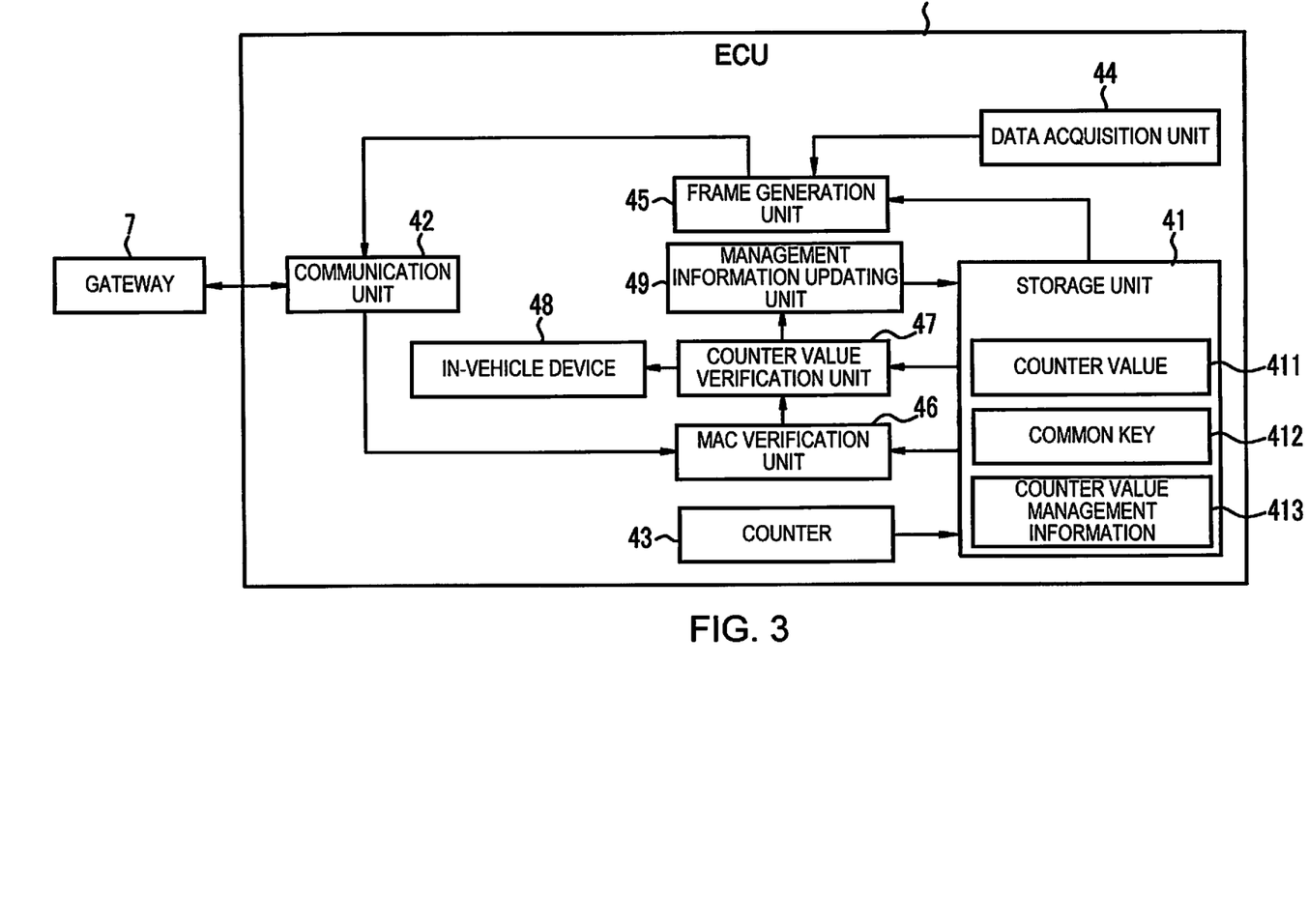
FIG. 3 is a block diagram showing a configuration of the ECU of FIG. 1.

FIG. 3 shows various functional units configured by the CPU of the ECU 4 operating based on the control program. The ECU 4 includes a storage unit 41, a communication unit 42, a counter 43, a data acquisition unit 44, a frame generation unit 45, an MAC verification unit 46, a counter value verification unit 47, an in-vehicle device control unit 48, and a management information updating unit 49. Although a detailed explanation will be omitted, the TCU 5 also has a similar configuration.

The storage unit 41 is composed of the ROM described above and stores a counter value 411, a common key 412, and counter value management information 413, which are used to deal with replay attacks on the in-vehicle network system 2. Here, a replay attack is a cyber-attack that involves sniffing data frames flowing through a network, storing their contents, and transmitting the stored or altered data frames to the network, thereby causing unauthorized behavior of devices within the network. A replay attack is performed by an external device that communicates with the TCU 5 or by an external device connected to the ODB port 6.

The communication unit 42 communicates with other ECUs 4 and TCUs 5 via the CAN 3 and the gateway 7. When receiving data frames transmitted from other ECUs 4 and TCUs 5, the communication unit 42 checks the CAN IDs of the data frames and receives only data frames having prescribed CAN IDs, i.e., only data frames related to the ECU 4 provided with the communication unit 42.

The counter 43 counts the number of times that a data frame has been sent to the CAN 3 and increments the counter value. That is, the counter 43 counts the number of times that the ECUs 4a-4e, the TCU 5, the OBD port 6, etc., in the in-vehicle network system 2 have transmitted data frames to the CAN 3. Therefore, the counters of each ECU 4a-4e and TCU 5 have the same counter value. The counter value counted by the counter 43 is stored in the storage unit 41, as indicated by reference numeral 411.

The data acquisition unit 44 acquires sensor information indicating the detection results of sensors from in-vehicle devices such as sensors connected to the ECU 4. The frame generation unit 45 generates control information, which includes sensor information based on the sensor information acquired by the data acquisition unit 44, and generates data frames to be transmitted by the communication unit 42 based on the generated control information. Specifically, the frame generation unit 45 sets the CAN ID in accordance with the type of sensor information acquired by the data acquisition unit 44. For example, the frame generation unit 45 stores a table in which the sensor information and the CAN IDs are associated and sets the CAN ID based on this table.

The frame generation unit 45 also generates an MAC using the common key 412 stored in the storage unit 41 based on the set CAN ID, the generated control information, and the counter value 411 stored in the storage unit 41 in order to deal with the above-described replay attacks. The same common key 412 is used in the ECUs 4a-4e and the TCU 5. Further, for calculation of the MAC, a method using a hash function (HMAC), a method using a block cipher algorithm (CMAC, etc.), or the like is used. The frame generation unit 45 generates a data frame based on the set CAN ID, control information that includes the sensor information acquired by the data acquisition unit 44, the counter value 411 stored in the storage unit 41, and the generated MAC. The MAC generated by the frame generation unit 45 corresponds to one example of a first message authentication code of the present invention.

Figure 4:
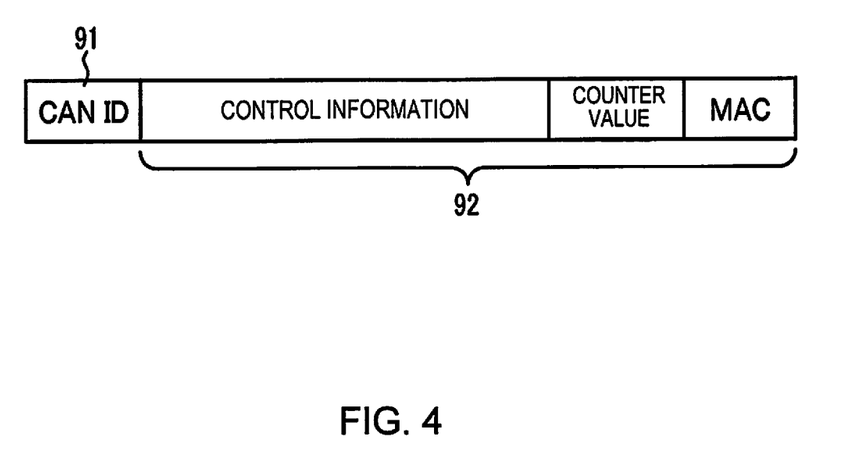
FIG. 4 is an explanatory diagram showing a data structure of a data frame communicated by the in-vehicle network system of FIG. 1.

FIG. 4 shows an example of the configuration of a data frame generated by the frame generation unit 45. The data frame includes an ID field 91 in which the CAN ID is stored and a data field 92 in which data are stored. Control information that includes the sensor information described above, a counter value, and an MAC are stored in the data field 92. The CAN ID, the control information, and the counter value correspond to one example of stored data of the present invention.

The MAC verification unit 46 verifies, based on the MAC of the data frame received by the communication unit 42, the validity of the data frame, that is, whether the received data frame was transmitted from another ECU 4 or TCU 5 within the in-vehicle network system 2. Specifically, the MAC verification unit 46 acquires the CAN ID, control information, counter value, and the MAC from the received data frame. Based on the acquired CAN ID, control information, and counter value, the MAC verification unit 46 generates a verification MAC using the common key 412 stored in the storage unit 41. This verification MAC corresponds to one example of a second message authentication code of the present invention.

The MAC verification unit 46 then compares the MAC obtained from the received data frame and the verification MAC and, if the obtained MAC and the verification MAC match, determines that the data of the received data frame is valid. If the MAC verification unit 46 determines that the data of the received data frame is valid, the MAC verification unit outputs the received data frame to the counter value verification unit 47. If the MAC verification unit 46 determines that the received data frame is invalid data, the MAC verification unit discards the received data frame. In this way, because the MAC can be used to detect and discard invalid data frames, it is possible to prevent replay attacks, etc., on the in-vehicle network system 2. Although the CAN ID, control information, and counter value are used for the generation of the MAC, any one or a combination of these three pieces of data may be used to generate the MAC.

The counter value verification unit 47 verifies, based on the counter value of the data frame received by the communication unit 42, the validity of the data frame, that is, whether or not the received data frame was transmitted from another ECU 4 or TCU 5 in the in-vehicle network system 2. The counter value verification unit 47 also uses the counter values of the received data frames to suppress the excessive discarding of data frames. That is, when the priority of the transmission process of the data frames is controlled at gateway 7 using the MAC ID, the transmission timing of data frames with low priority are delayed. Although these data frames whose transmission timings have been delayed include those that are necessary for controlling the vehicle 1, there are also those that have become unnecessary due to the transmission timing having been excessively delayed, so that it is necessary to make an appropriate selection from the data frames whose transmission timings have become delayed. In the present embodiment, since a counter value indicating the order of transmission is stored in the data, for example, when a data frame is received that has a counter value that is smaller than the counter value of an already-received data frame (that is, a data frame that is older than the already-received data frame), it is possible to carry out a process to discard this data frame. However, such a process may result in the discarding of important data frames or many data frames. For example, in the example shown in FIG. 2, an important data frame with the CAN ID of "105" and counter value of "48" is older than the data frame with the CAN ID of "105" and counter value of "45" and is thus discarded. In order to solve such a problem, the counter value verification unit 47 of the present embodiment uses the counter values of the received data frame to suppress the excessive discarding of data frames while dealing with replay attacks.

Figure 5A:
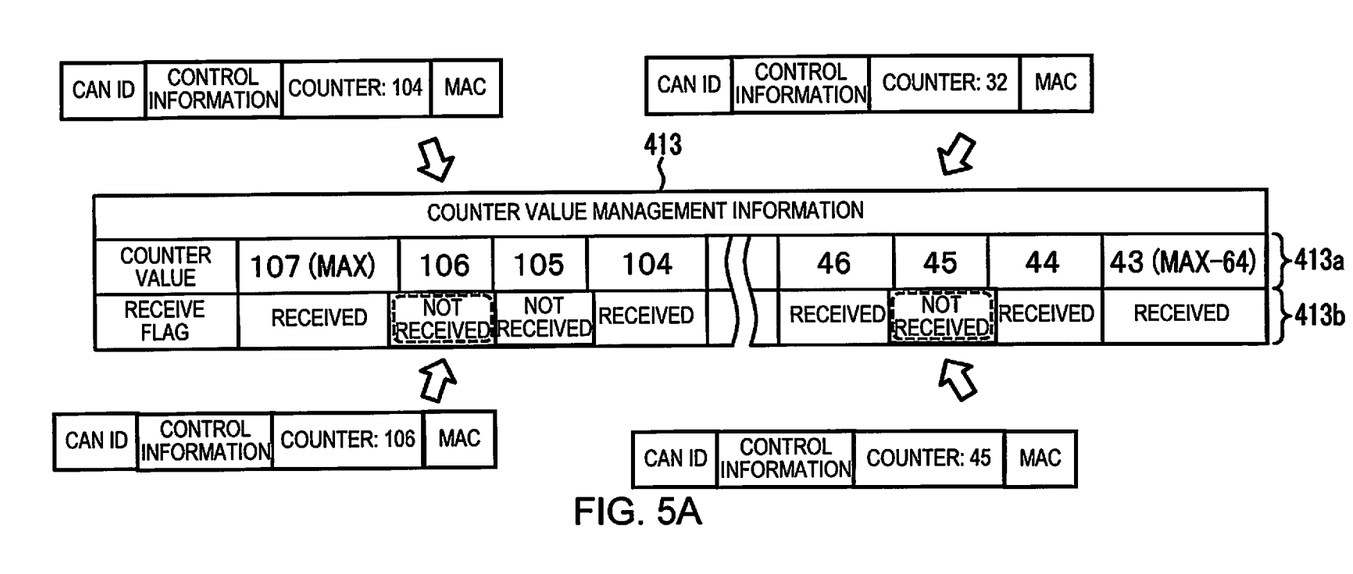
FIG. 5A is an explanatory diagram showing a state in which the validity of a data frame is verified using counter value management information of FIG. 1.
Figure 5B:
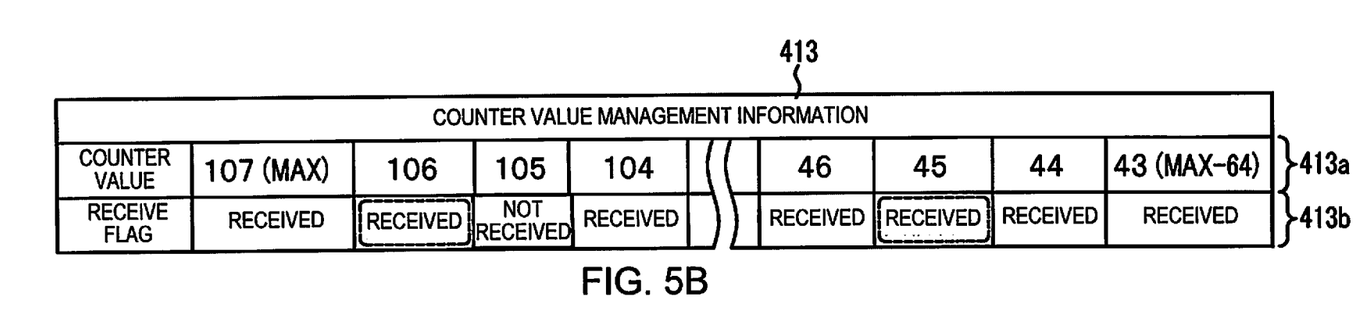
FIG. 5B is an explanatory diagram showing a state in which a receive flag of the counter value management information of FIG. 1 is updated.

The counter value verification unit 47 is equipped with the counter value management information 413 stored in the storage unit 41. The counter value management information 413 is used to manage the counter values of the transmitted data frames. As shown in FIG. 5A, the counter value management information 413 includes counter value management information 413a that indicates the counter value (for example, 107-43) in a prescribed numerical value width (for example, 64), and a receive flag 413b that indicates whether the data frame in which a counter value is stored has been received by any of ECUs 4 or TCU 5. The receive flag 413b registers a "received" receive flag for counter values that have already been received, and a "not received" receive flag for counter values that have not yet been received.

The counter value verification unit 47 verifies the validity of the above-described received data frame in accordance with whether the counter value of the received data frame is registered in the counter value management information 413. The counter value verification unit 47 also verifies the validity of the received data frame in accordance with whether the counter value of the received data frame has been received. More specifically, if the counter value of the received data frame has not yet been received, the counter value verification unit 47 determines that the received data frame is a valid data frame. Further, if the counter value of the received data frame has already been received or the counter value of the received data frame is smaller than the counter value registered in the counter value management information 413a, the counter value verification unit 47 determines that the received data frame is an invalid data frame.

For example, with regard to the counter value management information 413 shown in FIG. 5A, if the counter value of the newly received data frame is "106," the counter value verification unit 47 determines that the data frame with the counter value "106" is a valid data frame since this data frame has not yet been received. Further, if the counter value of the newly received data frame is "45," the counter value verification unit 47 determines that the data frame with the counter value "45" is a valid data frame since this data frame has not yet been received.

In contrast, if the counter value of the newly received data frame is "104," the counter value verification unit 47 determines that the data frame with the counter value "104" is an invalid data frame since this data frame has already been received. Further, if the counter value of the newly received data frame is "32," the counter value verification unit 47 determines that the data frame with the counter value "32" is an invalid data frame since it can be determined to be an old data frame not registered in the counter value management information 413a.

When counter value verification unit 47 determines that the received data frame is valid data, the counter value verification unit outputs the received data frame to the in-vehicle device control unit 48. The in-vehicle device control unit 48 controls in-vehicle devices based on the control information in the data frame output from the counter value verification unit 47. Further, when the counter value verification unit 47 determines that the received data frame is determined to be invalid data, the counter value verification unit discards the received data frame. Thus, since the counter value of the data frame is used to determine whether or not the data frame has been received, it is possible to detect and discard invalid data frames that have been transmitted disguised as data frames that have already been received. Further, since the numerical width of the counter value management information 413a is set to a prescribed number, data frames whose transmission timing has been slightly delayed can be received and old data frames whose transmission timing has been greatly delayed can be discarded.

The numerical width of the counter value management information 413a is preferably set to a value at which the suppression of excessive discarding of data frames and the reduction of security risks can both be achieved. That is, if the numerical width of the counter value management information 413a is widened, it is possible to suppress excessive discarding of data frames, but the number of data frames that can be used for a replay attack increases, so that the security risk increases. On the other hand, if the numerical width of the counter value management information 413a is narrowed, excessive discarding of data frames cannot be suppressed, but the number of data frames that can be used for a replay attack decreases, so that the security risk decreases. In this manner, the suppression of excessive discarding of data frames and the reduction of security risks are affected by the numerical width of the counter value management information 413a. In the example shown in FIG. 5A, the numerical width of the counter value management information 413a is set to "64," for example, so that it is possible to suppress the discarding of a maximum of 63 data frames and to prevent replay attacks. Further, if the shortest period at which the data frames are transmitted is, for example, 10 ms, it is possible to suppress the discarding of data frames for 630 ms, and to prevent replay attacks.

Figure 6A:
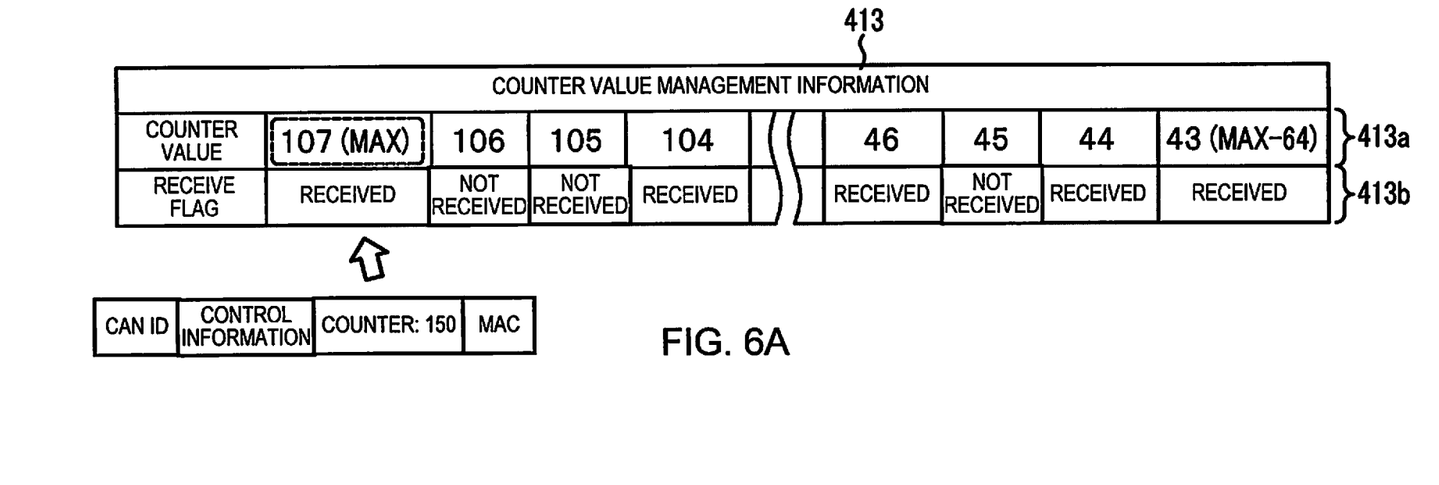
FIG. 6A is an explanatory diagram showing a state in which a data frame having a counter value that is larger than the maximum counter value of the counter value management information of FIG. 1 is received.
Figure 6B:
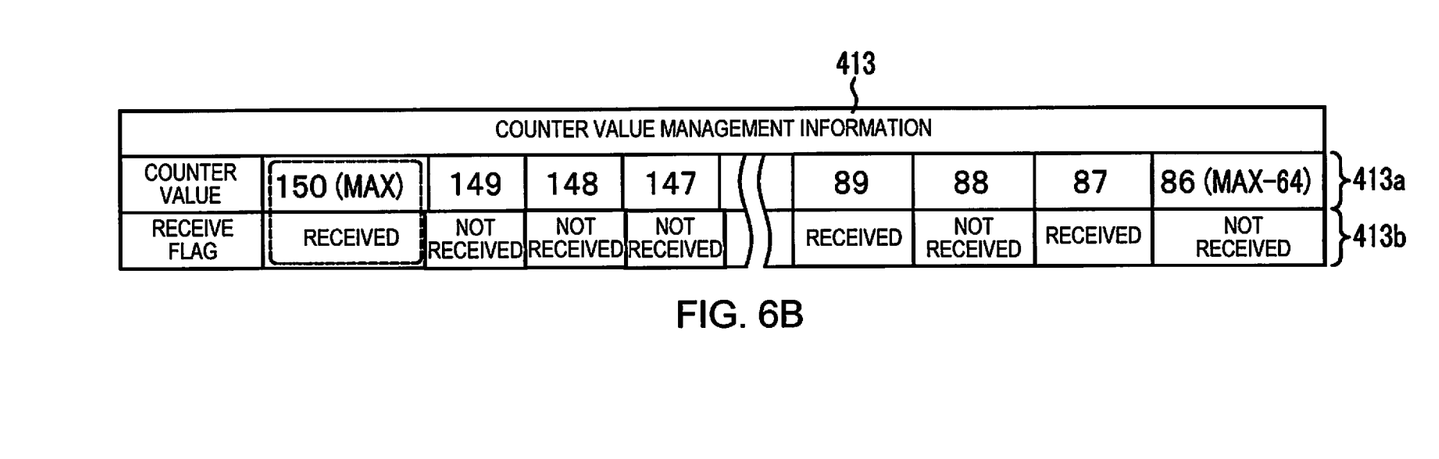
FIG. 6B is an explanatory diagram showing a state in which counter value information of the counter value management information of FIG. 1 is updated based on the maximum value of the counter value.

When the management information updating unit 49 receives a data frame that has not yet been received, the management information updating unit, based on the counter value of the received data frame, updates the receive flag 413b of the counter value management information 413 to "received." For example, in the counter value management information 413 shown in FIG. 5A, if the counter values of the newly received data frames are "106," and "45," since these data frames are unreceived, the management information updating unit 49 updates the receive flags of the data frames with the counter values "106" and "45" to "received," as shown in FIG. 6B.

Further, if the counter value of the newly received data frame is larger than the maximum value of the counter values registered in the counter value management information 413, the management information updating unit 49 updates the counter value management information 413a with a prescribed numerical width, such that the counter value of the newly received data frame becomes the maximum value in the counter value management information 413. For example, it is assumed that the counter value of the newly received data frame in the counter value management information 413 shown in FIG. 6A is "150," which is larger than the maximum value "107" of the counter value management information 413. In this case, as shown in FIG. 6B, the management information updating unit 49 updates the counter value "107-43" to "150-86" while maintaining the prescribed numerical width of "64" of the counter value management information 413a, such that the counter value "150" of the newly received data frame becomes the maximum value in the counter value management information 413. In this manner, since the counter value management information 413 is updated in accordance with the receive status of data frames, it is possible to reduce the security risk while suppressing the excessive discarding of data frames.

Figure 7:
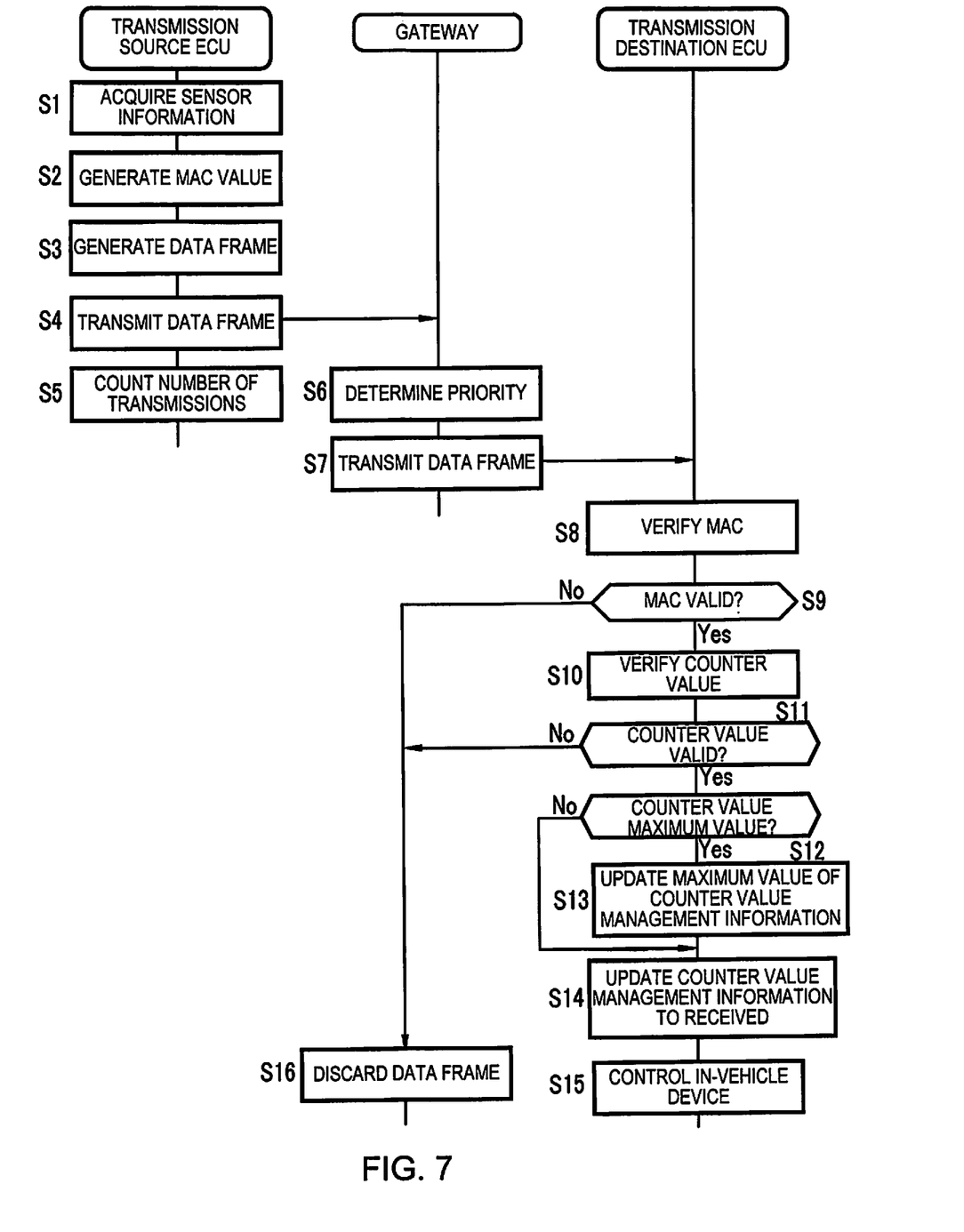
FIG. 7 is a sequence chart showing a procedure for communicating data frames in the in-vehicle network system of FIG. 1.

Next, the actions of the embodiment described above will be described based on the sequence chart shown in FIG. 7. A case will be described below in which a data frame is transmitted from the transmission source ECU 4a to the transmission destination ECU 4b. In Step S1 of FIG. 7, the transmission source ECU 4a that transmits the data frame acquires sensor information indicating the detection result of sensors, from connected sensors, etc., by means of the data acquisition unit 44. In the next Step S2, the transmission source ECU 4a generates an MAC value by means of the frame generation unit 45. Specifically, the frame generation unit 45 sets the CAN ID in accordance with the type of sensor information acquired by the data acquisition unit 44. Further, the frame generation unit 45 generates control information including sensor information in accordance with the type of the sensor information. Further, the frame generation unit 45 generates an MAC by means of the common key 412 stored in the storage unit 41, based on the set CAN ID, generated control information, and the counter value 411 stored in the storage unit 41.

In the next Step S3, the transmission source ECU 4a generates a data frame by means of the frame generation unit 45. The frame generation unit 45 generates a data frame based on the set CAN ID, the control information generated based on the sensor information, the counter value 411 stored in the storage unit 41, and the generated MAC. In the next Step S4, the transmission source ECU 4a transmits the generated data frame to the bus 3a of the CAN 3 by means of the communication unit 42. In the next Step S5, the transmission source ECU 4a increments the counter value of the counter 43. Although not shown in detail, the counting of the number of data frame transmissions is also carried out by other ECUs 4 and TCUs 5.

In Step S6, when the gateway 7 receives the data frame transmitted from the transmission source ECU 4a by means of the relay unit 71, the gateway determines the priority of the transmission process of the received data frame by means of the priority determination unit 72. The priority determination unit 72 determines the priority such that the smaller CAN ID, the higher the transmission process priority. Further, if there are a plurality of data frames with the same CAN ID, the priority determination unit 72 determines the priority such that the smaller the counter value, the higher the transmission process priority. In the next Step S7, the gateway 7 performs, by means of the relay unit 71, the transmission process by prioritizing data frames with a higher priority compared with data frames with a lower priority based on the priority determined by the priority determination unit 72. The relay unit 71 transmits the data frame received from the transmission source ECU 4a to the bus 3b.

The transmission destination ECU 4b confirms the CAN ID of the data frame flowing through the bus 3b by means of the communication unit 42, and receives the data frames having prescribed CAN IDs. In Step S8, upon receiving the data frame, the transmission destination ECU 4b verifies the MAC of the received data frame by means of the MAC verification unit 46. The MAC verification unit 46 obtains the CAN ID, the control information, the counter value, and the MAC from the received data frame. Using the common key 412 stored in the storage unit 41, the MAC verification unit 46 generates a verification MAC based on the acquired CAN ID, control information, and counter value.

In the next Step S9, the MAC verification unit 46 compares the MAC obtained from the received data frame and the verification MAC. The MAC verification unit 46 determines the received data frame to be valid data when the acquired MAC and the verification MAC match. If the received data frame is determined to be valid data, the MAC verification unit 46 outputs the received data frame to the counter value verification unit 47. And if the received data frame is determined to be invalid data, the MAC verification unit 46 discards the received data frame in Step S16.

If it is determined in the MAC verification unit 46 that the received data frame is valid data, in the next Step S10, the transmission destination ECU 4b verifies the validity of the received data frame based on the counter value by means of the counter value verification unit 47. The counter value verification unit 47 acquires the counter value from the received data frame and verifies whether the received data frame has already been received based on the acquired counter value and the counter value management information 413.

In the next Step S11, the transmission destination ECU 4b determines that the received data frame is a valid data frame if the counter value of the received data frame has not been received. And if the counter value of the received data frame has already been received or is smaller than the counter value in the counter value management information 413, the counter value verification unit 47 determines that the received data frame is an invalid data frame.

If the counter value verification unit 47 determines that the received data frame is valid data, the counter value verification unit then determines, in the next Step S12, whether the counter value of the newly received data frame is larger than the maximum value of the counter value registered in the counter value management information 413. If the counter value of the newly received data frame is larger than the maximum value of the counter values registered in the counter value management information 413, in the next step S13, the transmission destination ECU 4b updates the counter value management information 413 by means of the management information updating unit 49. The management information updating unit 49 updates the counter value management information 413a such that the counter value of the newly received data frame becomes the maximum value in the counter value management information 413.

In the next Step S14, the transmission destination ECU 4b updates the counter value management information 413 by means of the management information updating unit 49. Specifically, when a data frame that has not yet been received is received, the management information updating unit 49, based on the counter value of the received data frame, updates the receive flag 413b of the counter value management information 413 to "received".

When the received data frame is determined to be valid data, the counter value verification unit 47 outputs the received data frame to the in-vehicle device control unit 48. In the next Step S15, the in-vehicle device control unit 48 controls in-vehicle devices based on the control information of the data frame output from the counter value verification unit 47. And when the received data frame is determined to be invalid data, the counter value verification unit 47 discards the received data frame in Step S16.

As described above, the in-vehicle network system 2 of the present embodiment includes the plurality of ECUs 4a-4e, the TCU 5, and the gateway 7 that are connected to the CAN 3. The gateway 7 includes the relay unit 71, which carries out a receiving process for receiving data frames transmitted from the transmission source ECU 4a to the CAN 3 and a transmission process for transmitting the received data frames to the transmission destination ECU 4b, and a priority determination unit 72 for determining the priority of the transmission process of the received data frames based on the data frames received by the relay unit 71. The relay unit 71 carries out a transmission process of the data frames based on the priority determined by the priority determination unit 72. Thus, since the transmission process of the data frames is carried out on a prioritized basis, the transmission destination ECU 4b can receive the data frames at an appropriate timing in accordance with the priority.

Further, by means of the in-vehicle network system 2 of the present embodiment, when the relay unit 71 receives a plurality of data frames, the priority determination unit 72 determines the transmission process priority for the plurality of data frames based on the received plurality of data frames, and the relay unit 71 performs the transmission process of the plurality of data frames based on the determined priority. Thus, since the transmission process of the plurality of data frames is carried out based on the level of priority, the transmission destination ECU 4b can receive the plurality of data frames at an appropriate timing in accordance with the level of priority.

Further, by means of the in-vehicle network system 2 of the present embodiment, the relay unit 71 performs the transmission process by prioritizing data frames with a higher priority over those with a lower priority. This allows the transmission destination ECU 4b to preferentially receive data frames with a higher priority compared with data frames with a lower priority, so that higher priority processing can be performed quickly.

Further, by means of the in-vehicle network system 2 of the present embodiment, the priority determination unit 72 determines the priority based on the CAN ID that is included in the data frame, which eliminates the need for complex processing, reduces the processing load, and suppresses erroneous determinations.

Further, according to the in-vehicle network system 2 of the present embodiment, the transmission source ECU 4a is equipped with the frame generation unit 45 that generates an MAC based on stored data such as control information stored in the data frame and on the previously provided common key 412, and that generates a data frame in which the stored data and the generated MAC are stored; and the communication unit 42 that transmits the data frame in which the MAC is stored to the communication network. Further, the transmission destination ECU 4b is equipped with the communication unit 42 that receives a data frame in which the MAC is stored; and the MAC verification unit 46 that generates a verification MAC based on the common key 412 and on the stored data in the received data frame, and that verifies the validity of the received data frame based on whether the generated verification MAC and the received MAC match. This makes it possible to detect and discard invalid data frames using the MAC, thereby preventing replay attacks, etc., on the in-vehicle network system 2.

Further, according to the in-vehicle network system 2 of the present embodiment, the transmission source ECU 4a is equipped with the counter 43 that counts the number of transmissions of data frames to the CAN 3, and transmits data frames in which the counter values of the counter 43 are stored to the CAN 3. Further, the transmission destination ECU 4b is equipped the counter value verification unit 47 that stores the counter value management information 413 for managing the counter values of the data frames transmitted by the transmission source ECU 4a. When the counter value verification unit 47 receives a data frame in which a counter value is stored, the counter value verification unit verifies the validity of the received data frame based on the counter value of the received data frame and the counter value management information 413. Thus, since the validity of the data frame is verified by the counter value of the data frame, it is possible to detect and discard invalid data frames that have been transmitted disguised as data frames that have already been received, thereby preventing replay attacks, etc., on the in-vehicle network system 2.

Further, by means of the in-vehicle network system 2 of the present embodiment, the counter value management information 413a indicating the counter value of a prescribed numerical width is registered in the counter value management information 413, and the counter value verification unit 47 verifies the validity of the received data frame in accordance with whether or not the counter value of the received data frame is registered in the counter value management information 413. Thus, since the numerical width of the counter value management information 413a is set to a prescribed number, it is possible to receive data frames whose transmission timing has been slightly delayed while discarding old data frames whose transmission timing has been greatly delayed. Further, by appropriately setting the numerical width of the counter value management information 413a, the suppression of excessive discarding of data frames and the reduction of security risks can both be achieved.

Further, according to the in-vehicle network system 2 of the present embodiment, if the counter value of the newly received data frame is larger than the maximum value of the counter values registered in the counter value management information 413, the transmission destination ECU 4b updates the counter value management information 413a with a prescribed numerical width, such that the counter value of the newly received data frame becomes the maximum value in the counter value management information 413. In this manner, since the counter value management information 413 is appropriately updated in accordance with the receive status of data frames, security risks can be reduced while suppressing the excessive discarding of data frames.

Further, according to the in-vehicle network system 2 of the present embodiment, the counter values of data frames that have already been received or not yet received are registered in the counter value management information 413, and the counter value verification unit 47 verifies the validity of the received data frame in accordance with whether the counter value of the received data frame has already been received. It is thus possible to detect and discard invalid data frames that have been transmitted disguised as already received data frames, thereby preventing replay attacks, etc., on the in-vehicle network system 2.

Further, by means of the in-vehicle network system 2 according to the present embodiment, when a data frame that has not yet been received is received, the transmission destination ECU 4b updates the receive flag 413b of the counter value management information 413 to received based on the counter value of the received data frame. In this manner, since the counter value management information 413 is appropriately updated in accordance with the receive status of data frames, security risks can be reduced while suppressing the excessive discarding of data frames.

In the embodiment described above, a procedure was described in which the number of transmissions is counted by the counter 43 after transmitting a data frame, but it is also possible to count the number of transmissions with the counter 43 first, use the counter value after this count to generate an MAC, and transmit a data frame that includes the generated MAC. By this means, the counter value of the actual number of transmissions can be used for to verify the data frame.

Further, in the embodiment described above, an example was described in which a counter value of a prescribed numerical width (counter value management information 413a) and a counter value of an already-received or not yet-received data frame (receive flag 413b) is registered in the counter value management information 413, but the validity of the data frame may be verified using the counter value management information 413 in which only one of these counter values is registered. As described above, it is possible to verify the validity of a data frame using either the counter value of the prescribed numerical width or a counter value of an already-received or not yet-received data frame.

Figure 8:
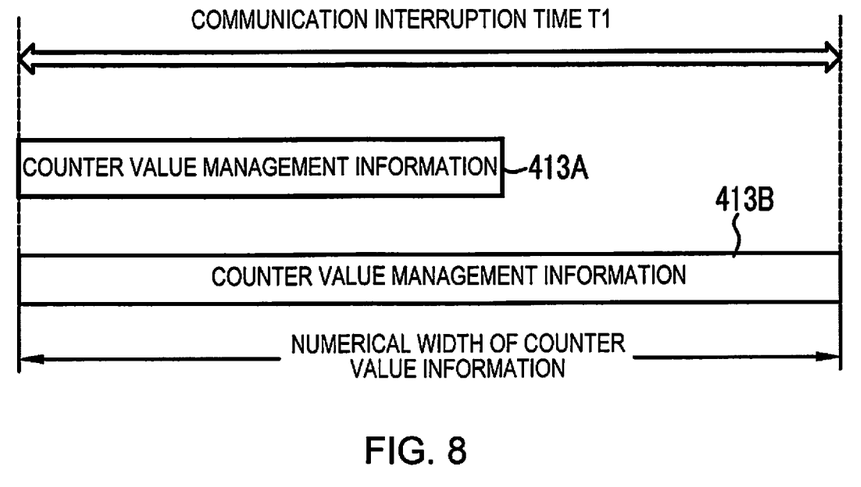
FIG. 8 is an explanatory diagram showing a state in which the counter value information of the counter value management information is controlled using a communication interruption time of the in-vehicle network system of FIG. 1 as the upper limit.

Further, in the embodiment described above, the prescribed numerical width of the counter value management information 413a of the counter value management information 413 is set to a fixed value, such as "64"; however, the numerical width of the counter value management information 413a may be controlled, for example, to be appropriately increased or decreased based on the data frame transmission frequency, or the like. This allows the security risk to be reduced while suppressing the excessive discarding of data frames even when the data frame transmission frequency changes. For example, in the example shown in FIG. 8, the numerical width of the counter value management information 413a is increased or decreased with the communication interruption time T1, at which time it is determined that communication in the CAN 3 has been interrupted, as the upper limit, as shown in the counter value management information 413A, 413B. The reason the upper limit of the numerical width of the counter value management information 413a is set to the communication interruption time T1 is that the communication interruption time T1 is the maximum time that the communication of data frames can be delayed in the CAN 3, and holding the counter value management information 413a beyond this time would be useless. If, for example, the communication interruption time T1 were 1 second and the shortest period for transmitting data frames were 10 ms, the maximum numerical width of the counter value management information 413a would be "100."

Figure 9:
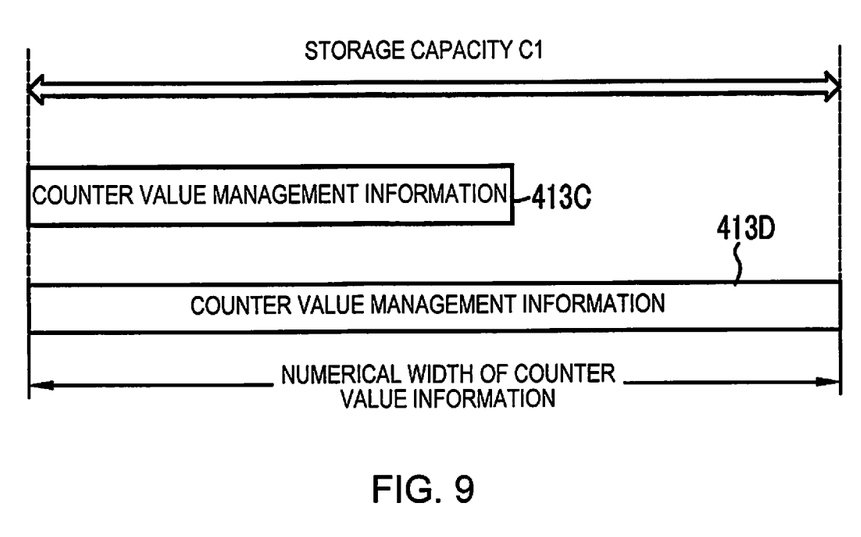
FIG. 9 is an explanatory diagram showing a state in which the counter value information of the counter value management information is controlled using the storage capacity of a buffer memory of the gateway of FIG. 1 as the upper limit.

Further, as shown in FIG. 9, the numerical width of the counter value management information 413a may be increased or decreased with the storage capacity C1 of a buffer memory that buffers data frames in the gateway 7 as the upper limit, as shown in counter value management information 413 C, 413D. By setting the storage capacity C1 of the buffer memory of the gateway 7 as the upper limit, the validity of all the data frames buffered in the gateway 7 can be verified based on the counter values. The numerical width of the counter value management information 413a may be increased or decreased with a storage capacity allocated for storing the counter value management information 413 in the storage unit 41 as the upper limit.

Figure 10:
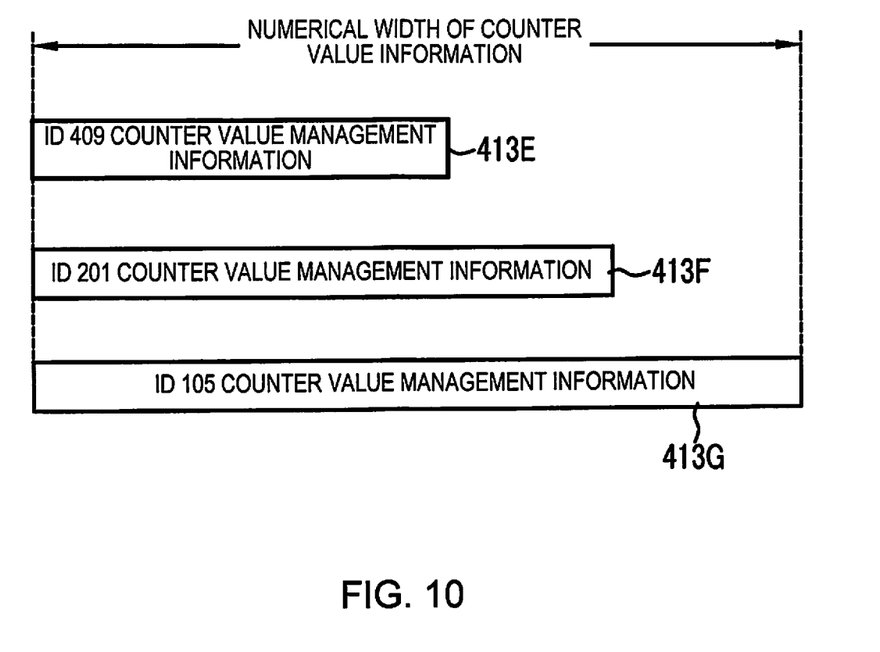
FIG. 10 is an explanatory diagram showing counter value management information provided for each type of data frame.

Further, as shown in FIG. 10, counter value management information 413E, 413F, 413G, etc., may be provided for each type of data stored in the data frame, i.e., for each CAN ID. This reduces the security risk while suppressing the excessive discarding of data frames for each type of data frame. In this case, the numerical width of the counter value management information 413a of the counter value management information 413E, 413F, 413G, may be increased or decreased based on the transmission frequency for each CAN ID. In the example shown in FIG. 10, the ID 105 counter value management information 413E used for verification of the data frame with CAN ID "105" with a low transmission frequency is set so that the numerical width of the counter value management information 413a is wider than the ID 409 counter value management information 341G used for verification of the data frame with CAN ID "409" with a high transmission frequency. This ensures that the data frame with CAN ID "105," which has low transmission frequency and is important, can be reliably verified with priority.

As described above, by means of the in-vehicle network system 2 of the present embodiment, the transmission destination ECU 4b controls the numerical width of the counter value management information 413a registered in the counter value management information 413. As a result, even if the data frame transmission frequency changes, the security risk can be reduced while suppressing the excessive discarding of data frames.

Further, by means of the in-vehicle network system 2 of the present embodiment, the transmission destination ECU 4b controls the numerical width of the registered counter value management information 413a with the prescribed communication interruption time T1, at which time it is determined that communication in the CAN 3 has been interrupted, as the upper limit, as shown in the counter value management information 413A, 413B. As a result, it is possible to reliably verify data frames whose communication was interrupted due to communication interruption of CAN 3 and to reduce the security risk while suppressing the excessive discarding of data frames for each type of data frame.

Further, by means of the in-vehicle network system 2 of the present embodiment, the transmission destination ECU 4b controls the numerical width of the registered counter value management information 413a with the storage capacity of the storage unit 41, which stores the counter value management information 413, or of the storage capacity C1 of a buffer memory that buffers data frames in the gateway 7, as the upper limit, as shown in counter value management information 413C, 413D. As a result, it is possible to verify the validity of all the data frames buffered in the gateway 7 based on the counter values, and to reduce the security risk while suppressing excessive discarding of data frames for each type of data frame.

Further, by means of the in-vehicle network system 2 of the present embodiment, the counter value management information 413E, 413G, etc., is provided for each type of data frame, i.e., for each CAN ID. Thus, the security risk can be reduced while suppressing the excessive discarding of data frames for each type of data frame.

Further, by means of the in-vehicle network system 2 of the present embodiment, the numerical width of the counter value management information 413a of the counter value management information 413E, 413G provided for each type of data frame is controlled based on the transmission frequency of each type of data frame. Thus, the security risk can be reduced while suppressing excessive the discarding of data frames based on the transmission frequency of each type of data frame.

Further, by means of the in-vehicle network system 2 of the present embodiment, the counter value management information 413A of the data frame of a type with a low transmission frequency is controlled such that the numerical width of the counter value management information 413a becomes wider than the counter value management information 413C of the data frame of a type with a high transmission frequency. This ensures that important data frames with a low transmission frequency can be reliably verified with priority and that security risks can be reduced while suppressing the excessive discarding of data frames.

The invention claimed is:

1. A communication system comprising:
a first electronic controller and a second electronic controller that are connected to a communication network; and
a relay device connected to the communication network and configured to relay communication between the first electronic controller and the second electronic controller, wherein
the relay device includes a relay unit configured to carry out a receiving process for receiving data frames transmitted to the communication network from the first electronic controller, and a transmission process for transmitting received data frames to the second electronic controller, and
the first electronic controller includes a counter for counting a number of transmissions of the data frames to the communication network, and is configured to transmit the data frames in which counter values of the counter are stored to the communication network,
the second electronic controller is configured to store counter value management information for managing the counter values of the data frames transmitted by the first electronic controller, and is configured to receive the data frame in which the counter value is stored, and
the second electronic controller is further configured to verify validity of the received data frame based on whether the counter value of the received data frame is registered in the counter value management information, wherein
the counter value of a prescribed numerical width is registered in the counter value management information, and
the second electronic controller is configured to control the numerical width of the counter value registered in the counter value management information.

2. The communication system according to claim 1, and further comprising
the relay device is further configured to determine a priority of the transmission process of the received data frames based on the data frames received by the relay unit, wherein
the relay unit is configured to carry out the transmission process of the data frames based on the determined priority.

3. The communication system according to claim 2, wherein
upon the relay unit receiving a plurality of the data frames, the relay device is configured to determine the priority of the transmission process of the plurality of data frames based on the plurality of data frames received, and
the relay unit is configured to carry out the transmission process of the plurality of data frames based on a determined priority.

4. The communication system according to claim 2, wherein
the relay unit performs the transmission process by prioritizing the data frames having a higher priority compared with the data frames having a lower priority.

5. The communication system according to claim 2, wherein
the relay device is configured to determine the priority based on a message ID included in the data frames.

6. The communication system according to claim 2, wherein
the first electronic controller is further configured to
generate a first message authentication code based on stored data stored in the data frames and a common key provided in advance, and configured to generate the data frames in which the stored data and the generated first message authentication code are stored, and
transmit the data frames in which the first message authentication code is stored to the communication network, and
the second electronic controller is further configured to
receive the data frames in which the first message authentication code is stored, and
generate a second message authentication code based on the stored data in the data frames received by the second electronic controller and the common key shared in common with the first electronic controller, and configured to verify the validity of the received data frame based on whether the second message authentication code that was generated and the first message authentication code that was received match.

7. The communication system according to claim 2, wherein
the second electronic controller is configured to verify the validity of the received data frame based on the counter value of the received data frame and the counter value management information.

8. The communication system according to claim 1, wherein
the second electronic controller is configured to update the counter value with a prescribed numerical width such that the counter value of newly received data frames becomes a maximum value in the counter value management information when the counter value of the newly received data frame is larger than the maximum value of the counter values registered in the counter value management information.

9. The communication system according to claim 1, wherein
the second electronic controller is configured to control the numerical width of the counter value registered in the counter value management information with a prescribed communication interruption time as an upper limit for determining that communication in the communication network has been interrupted.

10. The communication system according to claim 1, wherein
the second electronic controller is configured to control the numerical width of the counter value registered in the counter value management information as an upper limit with a storage capacity of a storage unit that stores the counter value management information, or a buffer capacity for buffering the data frames in the relay device.

11. The communication system according to claim 1, wherein the counter value management information is provided for each type of data frame.

12. The communication system according to claim 11, wherein
the second electronic controller is configured to control the numerical width of the counter value of the counter value management information provided for each type of data frame based on a transmission frequency for each type of the data frame.

13. The communication system according to claim 12, wherein
the second electronic controller is configured to control the numerical width of the counter value to be wider in the counter value management information of the data frames of a type with a low transmission frequency than in the counter value management information of the data frames of a type with a high transmission frequency.

14. The communication system according to claim 1, wherein
the counter value of the received data frame or a not received data frame is registered in the counter value management information, and
the second electronic controller is configured to verify the validity of the received data frame based on whether the counter value of the received data frame has already been received.

15. The communication system according to claim 14, wherein
when the not-received data frame is received, the second communication-device electronic controller is configured to update a receive flag to "received" for the counter value of the counter value management information.

16. The communication system according to claim 1, wherein
the second electronic controller is configured to discard the received data frames upon determining that the received data frames are invalid.

17. The communication system according to claim 1, wherein
the communication network is a CAN (Controller Area Network).

18. A receiving device connected to a communication network for receiving data frames transmitted from a transmission device connected to the communication network, the receiving device comprising:
an electronic controller configured to
receive the data frames in which counter values indicating a number of transmissions of the data frames to the communication network are stored,
store counter value management information for managing the counter values of the data frames transmitted by the transmission device,
receive the data frames in which the counter values are stored, and
verify validity of received data frames based on the counter value of the received data frames and the counter value management information,
the counter value of a prescribed numerical width being registered in the counter value management information, and
the numerical width of the counter value registered in the counter value management information being controlled.

19. A communication control method executed by a relay device that relays communication between a first electronic controller and a second electronic controller connected to a communication network, wherein
the first electronic controller
includes a counter for counting a number of transmissions of data frames to the communication network, and
is configured to transmit the data frames in which counter values of the counter are stored to the communication network,
the second electronic controller is configured to
store counter value management information for managing the counter values of the data frames transmitted by the first electronic controller,
receive the data frames in which the counter values are stored, and
verify validity of received data frames based on whether the counter value of the received data frames is registered in the counter value management information,
the counter value of a prescribed numerical width being registered in the counter value management information, and
the second electronic controller being configured to control the numerical width of the counter value registered in the counter value management information.

* * * * *